United States Patent
Hekimian

[15] 3,694,748
[45] Sept. 26, 1972

[54] PEAK-TO-PEAK DETECTOR

[72] Inventor: Norris C. Hekimian, Rockville, Md.

[73] Assignee: Hekimian Laboratories, Inc., Rockville, Md.

[22] Filed: July 19, 1971

[21] Appl. No.: 163,872

[52] U.S. Cl. ............324/103 P, 307/235 A, 307/246, 307/255, 328/135, 328/151, 329/204
[51] Int. Cl. ......................G01r 19/16, H03k 17/66
[58] Field of Search ......307/235 A, 235 R, 242, 236, 307/240, 246, 255; 324/103 R, 103 P, 101, 119; 328/116, 117, 135, 140, 147, 148, 151; 329/204, 206

[56] References Cited

UNITED STATES PATENTS

| | | | |
|---|---|---|---|
| 2,521,522 | 9/1950 | Keitley | 324/101 |
| 3,398,373 | 8/1968 | Caswell | 328/117 X |
| 2,603,779 | 7/1952 | Ferrill, Jr. | 324/103 P |
| 2,854,633 | 9/1958 | Jager | 324/119 X |
| 3,360,727 | 12/1967 | Justice | 324/119 X |
| 2,764,737 | 9/1956 | Parke | 324/103 P |
| 2,453,958 | 11/1948 | Andresen | 329/204 X |
| 2,491,921 | 12/1949 | Hepp | 329/204 X |
| 3,328,705 | 6/1967 | Eubanks | 324/103 R X |
| 3,471,714 | 10/1969 | Gugliotti, Jr. et al. | 207/255 X |
| 3,473,131 | 10/1969 | Perkins, Jr. | 307/236 X |
| 3,492,575 | 1/1970 | Campbell | 324/103 R |
| 3,566,145 | 2/1971 | Goodale | 307/236 X |

FOREIGN PATENTS OR APPLICATIONS

| | | | |
|---|---|---|---|
| 1,250,921 | 9/1967 | Germany | 324/103 P |
| 515,912 | 8/1955 | Canada | 324/103 P |

Primary Examiner—Herman Karl Saalbach
Assistant Examiner—L. N. Anagnos
Attorney—Rose & Edell

[57] ABSTRACT

A peak-to-peak detector includes an operational amplifier driving the bases of two complementary transistor switches in parallel, amplifier feedback being provided from the collectors of the transistors. Each transistor conducts in response to a different input signal polarity and, when conducting, permits a capacitor in its emitter circuit to charge to the peak amplifier output voltage. The charged capacitors bias their respective transistors off until the amplifier output voltage exceeds the stored capacitor voltage. The sum of the stored capacitor voltages is a measure of the peak-to-peak input voltage.

3 Claims, 1 Drawing Figure

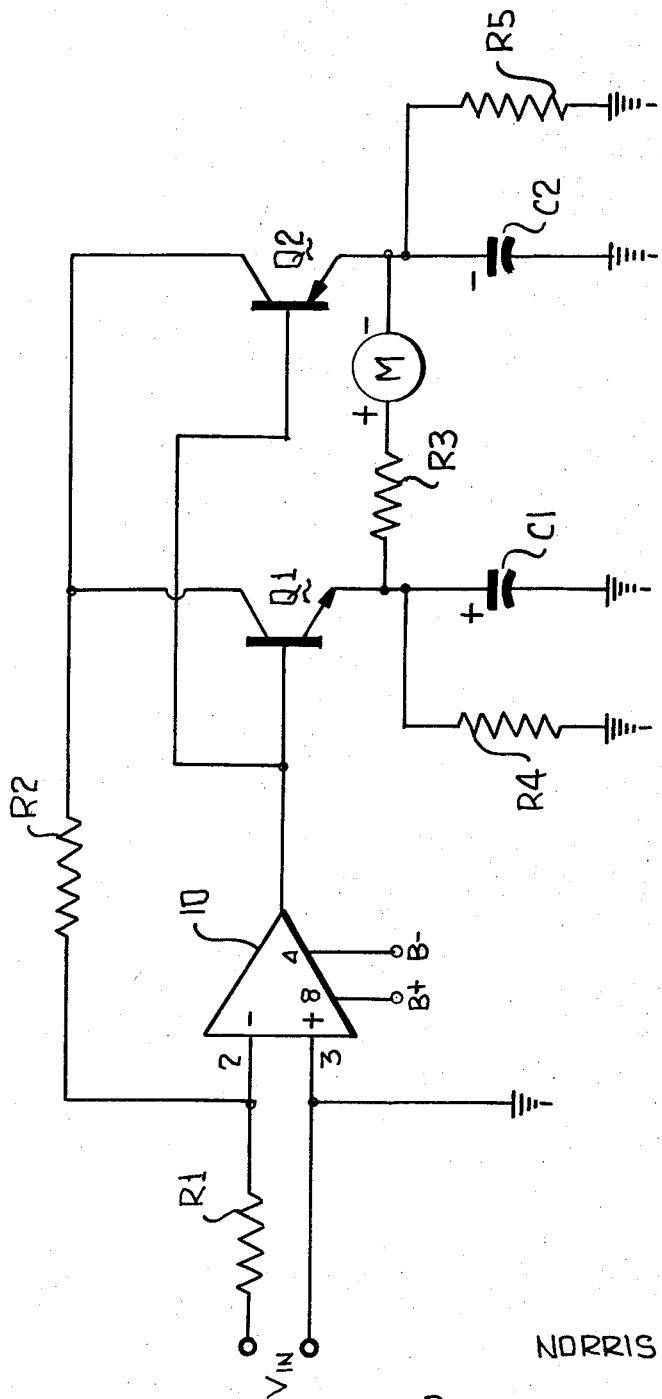

3,694,748

PEAK-TO-PEAK DETECTOR

BACKGROUND OF THE INVENTION

The present invention relates to peak-to-peak detector circuits and more particularly, to a peak-to-peak detector employing an operational amplifier.

Peak-to-peak detectors are circuits which measure the voltage (or current) difference between positive and negative peaks of a signal. These detectors are frequently utilized in electronic systems for measurement and control purposes and, therefore, should not significantly load the main signal flow path. For many applications, peak-to-peak detectors should be operable over a wide range of input signal levels and should be insensitive to power variations. Operational amplifiers have been utilized in some peak-to-peak detector circuits because of their high input impedance, wide signal level range and power supply independence. However, such circuits usually employ diodes as part of the detector. Since diode voltage versus current characteristics vary considerably, even among diodes of the same model number, each circuit must be custom-compensated to achieve any reasonable degree of peak-to-peak detection accuracy at low signal levels.

It is an object of the present invention to provide a peak-to-peak detector having a high input impedance, operable over a wide range of signal levels, and requiring no individualized compensation.

It is another object of the present invention to provide a peak-to-peak detector employing an operational amplifier without any diodes or elements requiring individualized compensation.

SUMMARY OF THE INVENTION

According to the present invention, an operational amplifier drives a pair of complementary transistor switches connected in parallel, each in common emitter configuration. Each transistor is therefore biased on in response to a different input signal polarity. The amplifier feedback resistor is connected between the amplifier input terminal and the junction of the transistor collectors. Each emitter circuit includes a capacitor which charges to the peak voltage across the feedback resistor when the respective transistor is conductive, the charged capacitor thereafter biasing the transistor off until the operational amplifier output voltage exceeds the voltage across the capacitor. A voltmeter connected in series with the two capacitors provides an indication of the peak-to-peak voltage applied to the amplifier input terminal.

BRIEF DESCRIPTION OF THE DRAWING

The above and still further objects, features and advantages of the present invention will become apparent upon consideration of the following detailed description of one specific embodiment thereof, especially when taken in conjunction with the accompanying drawings, wherein:

The FIGURE is a schematic diagram of a preferred peak-to-peak detector circuit of the present invention.

DESCRIPTION OF THE PREFERRED EMBODIMENT

Referring to the drawing in detail, input signal to the peak-to-peak detector is applied to the inverting input terminal of an operational amplifier 10 via input resistor R1. By way of example, amplifier 10 may be one-half of integrated circuit model MC1458 manufactured by the Motorola Corporation. When this model operational amplifier is employed, the amplifier terminal numbers indicated in the drawing are applicable. The non-inverting input terminal (3) of amplifier 10 is connected to ground. Amplifier 10 is also connected to +15 volts and −15 volts d.c. power supplies (at terminal 8 and 4, respectively).

The output terminal (1) of amplifier 10 is connected to the base of NPN transistor Q1 and to the base of PNP transistor Q2, the two transistors being connected in parallel. The collectors of transistors Q1 and Q2 are tied together and connected to one end of feedback resistor R2. The other end of the feedback resistor is connected to the inverting input terminal (2) of amplifier 10.

The emitter of transistor Q1 is connected directly to one end of each of capacitor C1 and resistor R4, the other ends of these elements being grounded. The emitter of Q2 is connected to one end of each of capacitor C2 and resistor R5, the other ends of which are connected to ground. A metering circuit includes current limiting resistor R3 and ammeter M connected in series between the emitters of Q1 and Q2.

In operation, assume initially that there is no charge on capacitors C1 and C2. If the input voltage $V_{in}$ goes positive, the output signal from amplifier 10 tends to go sharply negative, causing Q2 to conduct heavily and Q1 to become cut-off. Utilizing conventional operational amplifier theory, (reference: "Pulse and Digital Circuits," Millman and Taub, McGraw Hill, 1956, pp. 22–26), the voltage $V_{out}$ at the collectors of Q2 and Q1 is given by the following expression:

$$V_{out} = R2/R1 \, V_{in}$$

With Q2 saturated, the voltage drop from emitter to collector in Q2 becomes insignificantly small. Consequently, during saturation of Q2, capacitor C2 charges to the voltage $V_{out}$. If the input voltage remains positive but falls to some lower level, the output voltage from amplifier 10 remains negative but lessens in magnitude accordingly. The voltage across C2 is then greater than the voltage applied to the base of Q2, cutting the latter off. With Q2 cut off, C2 is only able to discharge through the relatively high resistance path provided by R5. Q2 can only be rendered conductive again when the positive input signal level drives the amplifier more negative than the negative voltage across C2. At such time C2 charges to the new peak and retains such charge.

A similar analysis is possible for negative input signal which drives the amplifier output signal sharply positive. This cuts off Q2 but renders Q1 heavily conductive. C1 therefore charges to $V_{out}$ and then cuts off Q1 unless the amplifier output voltage is driven more positive than the voltage across C1.

Meter M is effectively in series with the two capacitors C1 and C2 and registers a current reading equal to the sum of the voltages across the capacitors divided by the resistance of R3. This current is proportional to the sum of the capacitor voltages, which in turn is proportional to the peak-to-peak voltage of the input signal.

If the peak-to-peak voltage is required to effect some control function, the voltage across R3 may be utilized directly or with proper scaling.

Accuracy of the peak-to-peak detector depends only on good saturation of the transistors and on low transistor leakage during cut-off. Emitter base junction breakdown may limit the output voltage capability, but a diode connected in series with each base and additional base-to-emitter resistors would eliminate this problem with no performance loss.

Importantly, a single feedback resistor is employed and there are no matching problems. Other peak-to-peak detectors utilizing operational amplifiers have required plural amplifiers and depend upon precise diode and resistor matching, particular on low level input signals.

The disclosed circuit has been found insensitive to temperature, supply voltage variation, and active component selection. The output voltage swings from amplifier 10 and is limited only by the ± supply voltages, which in our example is ±15 volts d.c.

By way of example only, the following table lists values and model numbers for the components of FIG. 1 which were employed in a particular embodiment:

| | |
|---|---|
| R1 | 10K |
| R2 | adjustable; 10K (nominal) |
| R3 | 68K |
| R4 | 100K |
| R5 | 100K |
| C1 | 22µf |
| C2 | 22µf |
| Q1 | 2N3566 |
| Q2 | 2N5138 |
| Amplifier 10 | 1/2 MC1458 |
| Meter M | 50µ Amp movement |

The foregoing values and model numbers can be varied significantly within the scope of the present invention, depending upon the nature of the signal, the operating environment, and the components available to the user.

While I have described and illustrated one specific embodiment of my invention, it will be clear that variations of the details of construction which are specifically illustrated and described may be resorted to without departing from the true spirit and scope of the invention as defined in the appended claims.

I claim:

1. A peak-to-peak detector, comprising:
    an operational amplifier having an input terminal adapted to receive a polarity-varying input signal and an output terminal providing an amplified version of said input signal;
    an NPN transistor having base emitter and collector electrodes;
    a PNP transistor having base, emitter and collector electrodes;
    means connecting said output terminal to the base electrodes of both of said transistors;
    a feedback resistor connected between said input terminal and the collector electrodes of both of said transistors;
    a first storage capacitor connected between the emitter electrode of said NPN transistor and ground; and
    a second storage capacitor connected between the emitter electrode of said PNP transistor and ground;
    wherein said NPN transistor is rendered conductive by a signal of one polarity at said output terminal to permit said first storage capacitor to charge to the peak voltage across said feedback resistor, the resulting charge across said first storage capacitor biasing said NPN transistor off unless a voltage of said one polarity in excess of said resulting charge is developed at said output terminal to permit further charging of said first capacitor; and
    wherein said PNP transistor is rendered conductive by a signal of polarity opposite said one polarity at said output terminal to permit said second storage capacitor to charge to the peak voltage across said feedback resistor, the resulting charge across said second storage capacitor biasing said PNP transistor off unless a voltage of said opposite polarity in excess of said resulting charge is developed at said output terminal to permit further charging of said second capacitor.

2. The circuit according to claim 1 further comprising a first relatively high resistance connected in parallel with said first storage capacitor and a second relatively large resistance connected in parallel with said second storage capacitor, said first and second high resistances permitting relatively slow discharge of said capacitors.

3. The circuit according to claim 1 further comprising metering means connected between said emitter electrodes to measure the sum of the voltages across said first and second capacitors.

* * * * *